United States Patent
Chen (10) Patent No.: US 12,517,774 B2
(45) Date of Patent: Jan. 6, 2026

(54) APPARATUS AND METHOD FOR HANDLING SUDDEN POWER LOSS OF STORAGE DEVICE

(71) Applicant: MEDIATEK INC., Hsin-Chu (TW)

(72) Inventor: Cheng-Liang Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 18/407,465

(22) Filed: Jan. 9, 2024

(65) Prior Publication Data

US 2025/0224888 A1    Jul. 10, 2025

(51) Int. Cl.
*G06F 11/07* (2006.01)
*G06F 3/06* (2006.01)

(52) U.S. Cl.
CPC ........ *G06F 11/0727* (2013.01); *G06F 3/0625* (2013.01); *G06F 3/0655* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2017/0149925 A1* | 5/2017 | Yang | H04L 41/069 |
| 2020/0202942 A1 | 6/2020 | Bonitz | |
| 2020/0365198 A1* | 11/2020 | Sudo | G11C 16/225 |
| 2021/0391015 A1* | 12/2021 | Shin | G11C 16/32 |
| 2025/0021243 A1* | 1/2025 | Park | G06F 3/0625 |

FOREIGN PATENT DOCUMENTS

| | | |
|---|---|---|
| CN | 107767899 | 3/2018 |
| TW | 201403318 | 1/2014 |

* cited by examiner

*Primary Examiner* — Charles J Choi
(74) *Attorney, Agent, or Firm* — Winston Hsu (57) ABSTRACT

An apparatus for use in a host system to control a storage device is provided. The apparatus includes a power-loss detection module, a power-loss handling command buffer and a storage host controller. The power-loss detection module is configured to determine whether a power-loss event occurs according to a level of a supply voltage. The power-loss handling command buffer is configured to store one or more power-loss protection commands. The storage host controller is coupled to the power-loss detection module and the power-loss handling command buffer and configured to execute the one or more power-loss protection commands in the power-loss handling command buffer in response to the power-loss event, thereby to perform one or more specific operations on the storage device.

18 Claims, 5 Drawing Sheets

APPARATUS AND METHOD FOR HANDLING SUDDEN POWER LOSS OF STORAGE DEVICE

BACKGROUND

The present invention relates to storage devices, and more particularly, to an apparatus and method for handling sudden power loss of storage devices.

During the process of writing data to a storage device or erasing data from the storage device, a sudden power loss has the potential to cause data corruption within the storage device. Taking NAND flash memory as an example, a sudden power loss while erasing a block or programing data could result in partial or complete data corruption within an affected block. Specifically, during a time interval from when an erase command is issued to the moment a destination block finishes its busy state, or when a write command is issued to the moment a destination page finishes its busy state, a sudden power loss may result in data corruption within the block.

In the condition where the sudden power loss occurs, if a power supply for dynamic random access memory (DRAM), which temporarily stores data to be programed to the storage device, is interrupted before a power supply for the host and the storage device is interrupted, there is a risk of data corruption. This is because the host and the storage device are still operational for a brief period after the DRAM is powered down, such that the storage device may receive erroneous data from the DRAM.

In the conventional art, to counteract the possibility of data corruption during sudden power loss while programming or erasing data on a storage device, the host system might utilize data recovery methods implemented through software operating on its storage controller or the device controller of the storage device. These methods are designed to minimize the chances of data corruption. Additionally, it is also proposed in the conventional to optimize power-down sequences on the circuit board. This optimization ensures that the power supply to the host system or the storage device is cut off before the power supply to the DRAM is interrupted, subsequently decreasing the probability of acquiring corrupted data from the DRAM. However, both of these approaches contain flaws, rendering them potentially incapable of fully preventing data corruption due to sudden power loss. Consequently, there exists a need in the field for a method to resolve data corruption that could arise due to sudden power loss.

SUMMARY

With this in mind, it is one object of the present invention to provide an apparatus and method for handling sudden power loss events. The present invention features a dedicated command buffer, serving as part of a storage host controller. This command buffer is designed to retain a pre-configured set of power-loss protection commands set up through software operating on the host system, ensuring rapid response in the power-loss event. Upon receiving a notification of the power loss, the storage host controller immediately executes the power-loss protection commands stored in the dedicated command buffer. This allows for efficient and timely data protection under such critical circumstances. This approach successfully reduces the impact of sudden power loss on data within the storage device, thereby elevating data integrity and security.

According to one embodiment, an apparatus for use in a host system to control a storage device is provided. The apparatus comprises a power-loss detection module, a power-loss handling command buffer and a storage host controller. The power-loss detection module is configured to determine whether a power-loss event occurs according to a level of a supply voltage. The power-loss handling command buffer is configured to store one or more power-loss protection commands. The storage host controller is coupled to the power-loss detection module and the power-loss handling command buffer and configured to execute the one or more power-loss protection commands in the power-loss handling command buffer in response to the power-loss event, thereby to perform one or more specific operations on the storage device.

According to one embodiment, a method for use in a host system to control a storage device is provided. The method comprises: storing one or more power-loss protection commands; determining whether a power-loss event occurs according to a level of a supply voltage; and executing the one or more power-loss protection commands in response to the power-loss event, thereby to perform one or more specific operations on the storage device.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment.

Furthermore, the particular features, structures or characteristics may be combined in any suitable combinations and/or sub-combinations in one or more embodiments.

Figure 1:
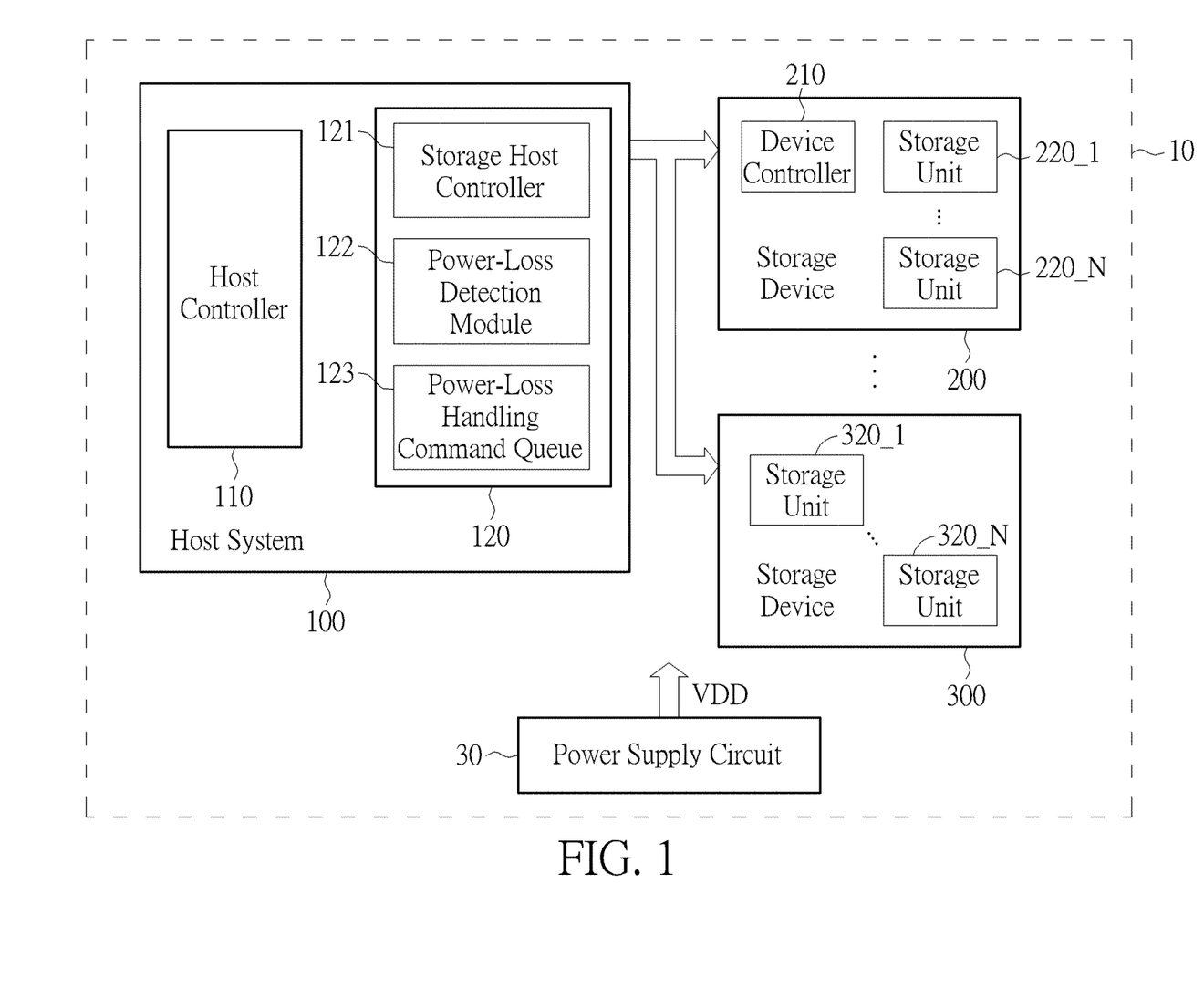
FIG. 1 illustrates an electronic device including a host system and storage devices according to one embodiment of the present invention.

FIG. 1 illustrates an electronic device including a host system and storage devices according to one embodiment of the present invention. As illustrated, an electronic device 10 comprises a host system 100 and the storage devices 200 and 300. The host system 100, along with the storage devices 200 and 300, are components of the electronic device 10, serving to implement specific functionalities of the electronic device 10. The host system 100 is operable to managing operations, processing data, and executing instructions, while storage devices 200 and 300 are configured to provide storage space for accumulation, retention, and retrieval of data within electronic device 10.

In one embodiment, the host system 100 can be embodied within a chip, adopting a System on Chip (SoC) architecture, thereby facilitating compactness and enhanced integration of multiple subsystems. In one embodiment, the storage devices 200 and 300 can be implemented on flash memory technology, which could be realized as Universal Flash Storage (UFS) devices, Embedded Multi MediaCard (eMMC) devices, or as devices based on NAND or NOR flash memory technologies. Moreover, the host system 100 may interface with the storage devices 200 and 300 via a specific communication protocol, enabling data transfer, synchronous operations, and error detection and correction mechanisms.

The host system 100 comprises a host controller 110 and an apparatus 120. The host controller 110 serves as a central core of the host system 100, fundamentally responsible for orchestrating operations of various components and subsystems contained within the host system 100, ensuring s integration and coherent functionality among components and subsystems. The apparatus 120 is configured for handling sudden power loss events. The apparatus 120 comprises a storage host controller 121, a power-loss detecting module 122, a power-loss handling command buffer 123. The storage host controller 121 is configured to control any peripheral storage devices connected to the host system 100, in response to requests initiated by the host controller 110. Also, the storage host controller 121 is configured to perform control over storage devices 200 and 300, managing access, erase, read, and write operations.

Please note that, the storage devices 200 and 300 mentioned in the embodiment are just for illustrative purposes rather than limitations. According to various embodiments of the present invention, the storage devices controllable by the host system 100 and the storage host controller 121 may be different from this embodiment in counts and types. In addition, the electronic device 10 further comprises a power supply circuit 30 for providing a supply voltage VDD to various components with the electronic device 10, thereby to provide sufficient power for the electronic device 10.

Figure 2:
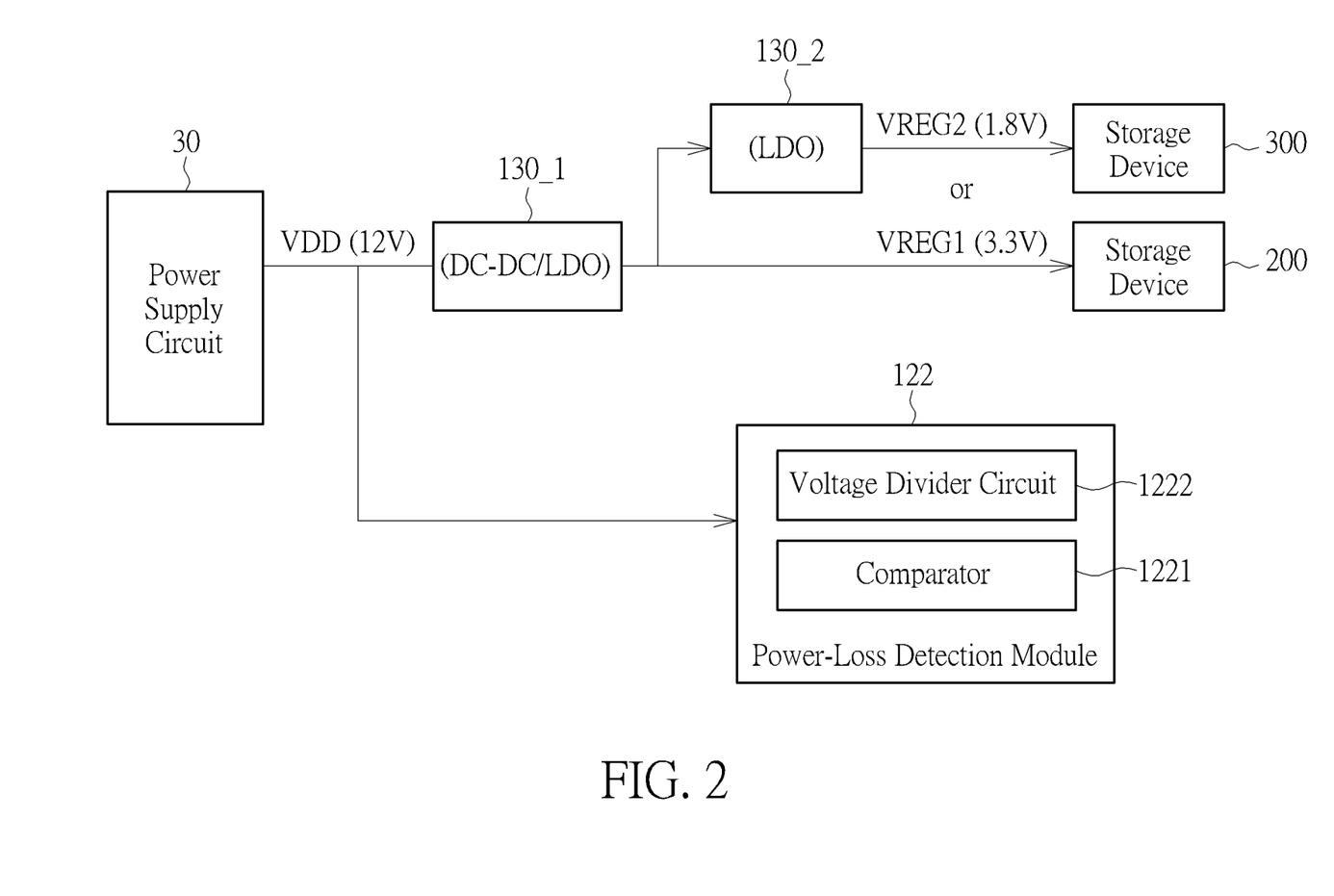
FIG. 2 illustrates how the power-loss detecting module operates according to one embodiment of the present invention.

Please refer to FIG. 2, which illustrates how the power-loss detecting module operates according to one embodiment of the present invention. Within the host system 100, there could be one or more voltage conversion circuits 130_1 and 130_2 that are operable to provide regulated or converted supply voltages for the storage devices 200 and 300. According to various embodiments, the voltage conversion circuits 130_1 and 130_2 may comprise linear dropout regulators (LDOs), DC-DC converters or the like. In one embodiment, the supply voltage VDD provided by the power supply block 30 could be at 12V, the voltage conversion circuits 130_1 and 130_2 could convert the supply voltage VDD of 12V into regulated or converted voltages REG1 of 3.3V or REG2 of 1.8V. As illustrated in FIG. 2, the power-loss detecting module 122 comprises a comparator 1221 and optionally a voltage divider circuit 1222. Typically, the comparator 1221 is configured to determine whether a level of the supply voltage VDD is lower than a predetermined safety threshold by comparing either the supply voltage VDD or the converted voltage VREG that is derived from the supply voltage VDD with the predetermined safety threshold, thereby to determine whether the power-loss event occurs. In some embodiments, the power-loss detecting module 112 may rely on the voltage divider circuit 1222 to divide the supply voltage VDD or the regulated or converted voltage VREG to generate a divided voltage. Accordingly, the comparator 1221 compares the divided voltage with the predetermined safety threshold to determine whether the power loss event occurs. However, this is not intended to limit the present invention in scope. In some embodiments, the voltage divider circuit 1222 is not necessary.

If the comparator 122 detects that the level of the supply voltage VDD or the regulated/converted voltage VREG is lower than the predetermined safety threshold, the power-loss detecting module 122 determines the power-loss event occurs, sending a power-loss event notification to the storage host controller 121. Upon receipt the power-loss event notification, the storage host controller 121 is configured to execute one or more power-loss protection commands stored in the power-loss handling command buffer 123.

Typically, the power-loss handling command buffer 123 retains a sequence of pre-configured commands, specifically configured for handling power-loss events. The power-loss handling command buffer 123 is one among several associated with storage host controller 121. Distinguished from other command buffers (not illustrated) within the storage host controller 121, the power-loss handling command buffer 123 exclusively accommodates commands related to power-loss handling, whereas other command buffers are designated for commands pertaining to regular operations. Furthermore, commands within the power-loss handling command buffer 123 are given precedence, holding higher priority over those in other command buffers, ensuring immediate response to power-loss events. The storage host controller 121 can execute the power-loss protection commands to perform specific operations on the storage devices 200 and 300, thereby safeguarding the data within the storage devices 200 and 300.

The operations performed on the storage devices 200 and 300 after the storage host controller 121 executes the power-loss protection commands may vary contingent upon whether a device controller is inherent within the storage devices 200 and 300.

Figure 3:
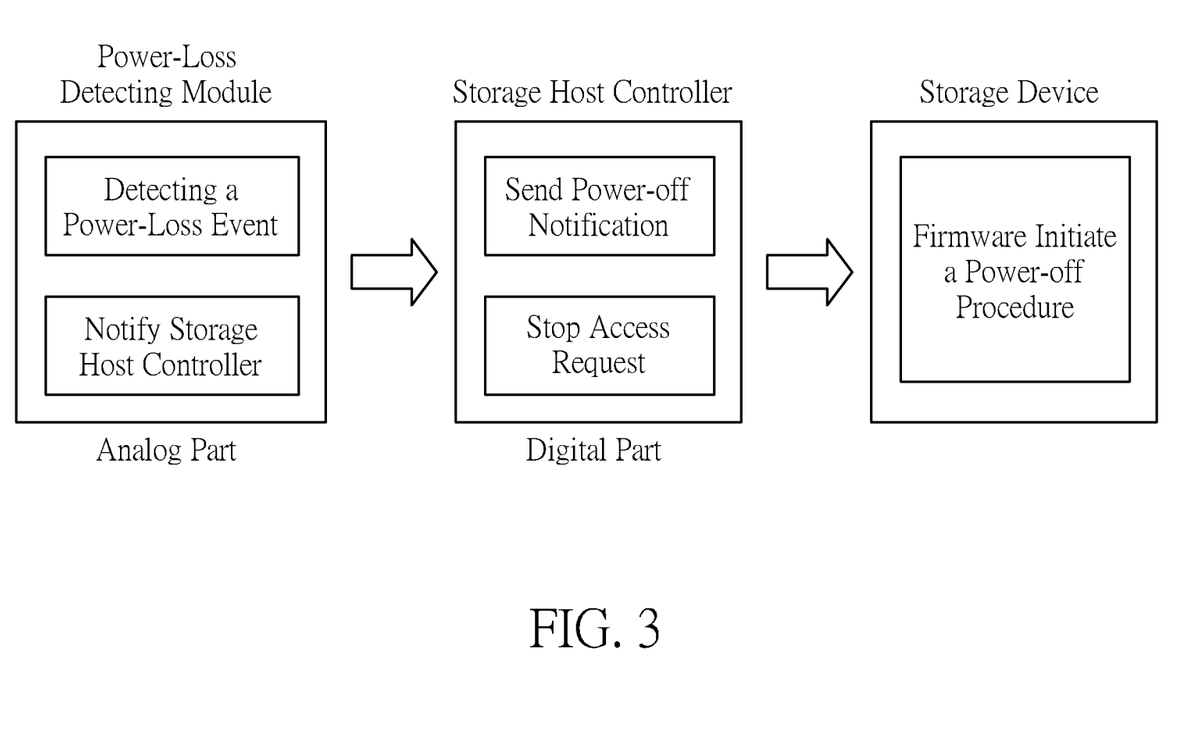
FIG. 3 illustrates a flow of handling power-loss events for storage devices with device controller according to one embodiment of the present invention.

Please refer to FIG. 3, which illustrates a flow of a method of handling power-loss events for storage devices with device controller (e.g., the storage device 200) according to one embodiment. In such embodiment, the storage device 200 can be an eMMC or UFS storage device, it comprises a device controller 210 and storage units 220_1-220_N (i.e., NAND or NOR flash memory chips). A firmware/software running on the device controller 210 is relied upon to manage access to the storage units 220_1-220_N. The method of handling power-loss events for the storage devices with device controller can be implemented on an analog part (e.g., an analog module) and a digital part (e.g., a digital module) of the host system 100. Specifically, the power-loss detecting module 122 included in the analog module is configured to determine whether a power-loss event occurs by comparing the supply voltage VDD or a voltage derived from the supply voltage VDD with a predetermined threshold.

If the power-loss detecting module 122 detects the power-loss event, it notifies the storage host controller 121 included in the digital module of the power-loss event. In response to the power-loss event, the storage host controller 121 executes one or more power-loss protection commands stored in the power-loss handling buffer 123. In one embodiment, the execution of one or more power-loss protection commands would trigger the storage host controller 121 to send a power-off notification to the storage device 200. Upon receiving the power-off notification, the firmware/software running on the device controller 210 would initiate a power-off procedure, which entails executing a series of specific operations on the storage units 220_1-220_N to safeguard the integrity and the security of the data within the storage device 200. According to various embodiments, the execution of the one or more power-loss protection commands may further trigger the storage host controller 121 to perform different operations. For example, the execution of the one or more power-loss protection commands may trigger the storage host controller 121 to stop sending further access requests to the storage device 120 after sending the power-off notification to the storage device 120.

Figure 4:
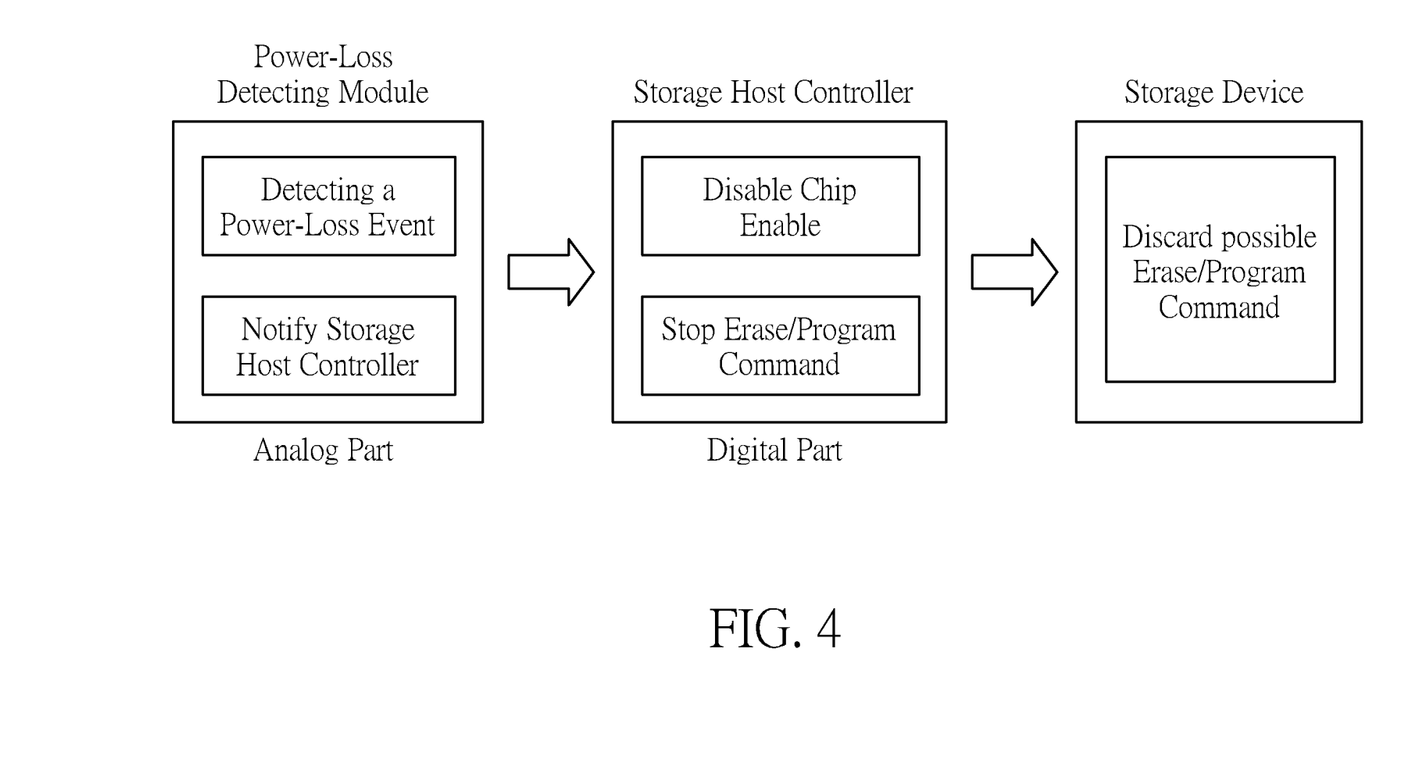
FIG. 4 illustrates a flow of handling power-loss events the storage devices without device controller according to one embodiment of the present invention.

Please refer to FIG. 4, which illustrates a flow of a method of handling power-loss events the storage devices without device controller (e.g., the storage device 300) according to one embodiment. In such embodiment, the storage device 300 can be a compilation of NAND or NOR flash memory chips, integrated with simplistic control circuitry, it comprises storage units 320_1-320_N (i.e., NAND or NOR flash memory chips). The storage units 320_1-320_N are directly accessed by the storage host controller 121. The method of handling power-loss events for the storage devices without device controller can be also implemented on the analog module and the digital module of the host system 100. Specifically, the power-loss detecting module 122 included in the analog module is configured to determine whether the power-loss event occurs.

Upon detecting the power-loss event, the power-loss detecting module 122 notifies the storage host controller 121 of the power-loss event. In response to the power-loss event, the storage host controller 121 executes one or more power-loss protection commands stored in the power-loss handling buffer 123. The execution of the one or more power-loss protection commands would trigger the storage host controller 121 to configure the deployment of specific control signals to the storage device 300. In one embodiment, the execution of the one or more power-loss protection commands would trigger the storage device controller 121 to configure a chip enable (CE) signal between the storage host controller 121 and the storage device 300, wherein the chip enable signal will be configured to a disabling state, thereby deactivating the storage units 320_1-320_N. This means the storage device 300 would discard following erase and program commands. In addition, the execution of the one or more power-loss protection commands would trigger the storage device controller to stop sending further erase and program commands to the storage device 300. In one embodiment, the execution of the one or more power-loss protection commands would further trigger the storage device controller 121 to maintain a write protection signal between the storage host controller 121 and the storage device 300 at a writable state or erasable state. This would allow an ongoing operation of the one or more storage units 320_1-320_N to complete in a condition where commands, addresses and/or data of write/erase requests has been fully received by the storage device 300 but the one or more storage units 320_1-320_N are still in a busy state. Maintaining the write protection signal at a writable state or erasable state would ensure conservation of data and preventing potential data corruption or loss within the storage device 300.

Figure 5:
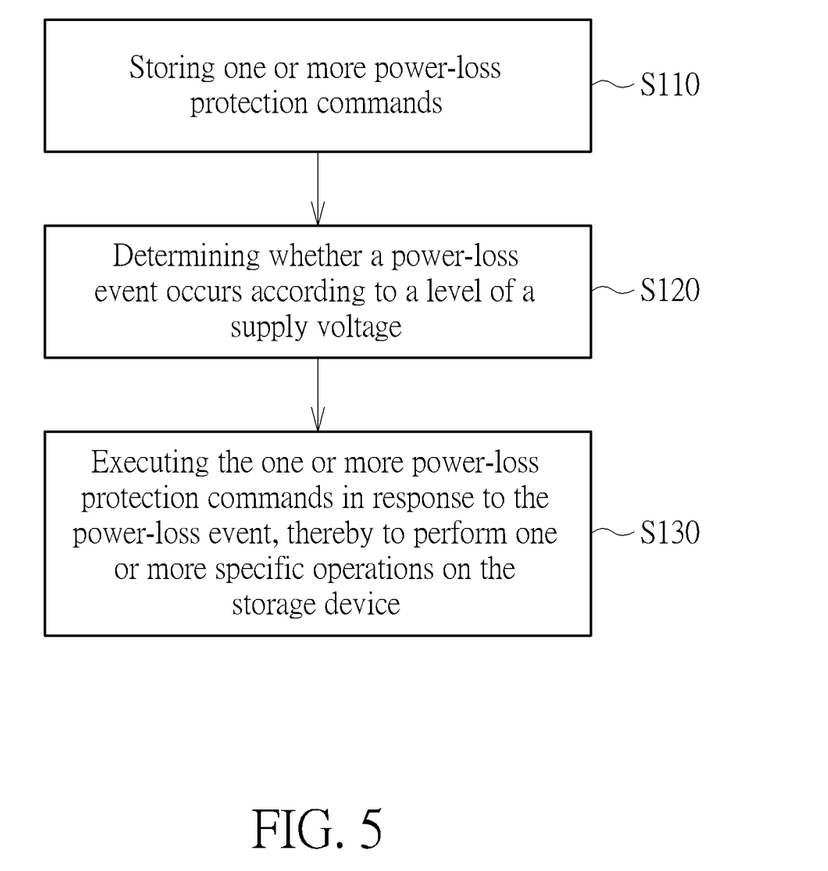
FIG. 5 illustrates a simplified flow of a method of handling power-loss events to one embodiment of the present invention.

FIG. 5 illustrates a flow chart of a method for use in a host system to control one or more storage device according to one embodiment of the present invention. As shown in the figure, the method of the present invention includes the following simplified flow:

Step S110: storing one or more power-loss protection commands;

Step S120: determining whether a power-loss event occurs according to a level of a supply voltage; and Step S130: executing the one or more power-loss protection commands in response to the power-loss event, thereby to perform one or more specific operations on the storage device.

Since principles and specific details of the foregoing steps have been explained in detail through the above embodiments, further descriptions will not be repeated here. It should be noted that the above flow may be possible, by adding other extra steps or making appropriate modifications and adjustments, to better improve flexibility and further improve accuracy and efficiency of handling the power-loss events.

The present invention features a specialized command buffer designed for retaining a sequence of power-loss protection commands, pre-configured for optimal response in sudden power loss events. This feature is crucial for the preservation of data integrity and security within storage devices. The present invention operates by immediately notifying the storage device to cease any ongoing erase and write operations, thus eliminating the risks of data loss and corruption in the event of sudden power loss. In conclusion, the integration and implementation of the power-loss protection command buffer in the System-on-Chip (SoC) manifest in improved overall data security and heightened system reliability. This advancement is significant in ensuring that the SoC system can withstand and adapt to unforeseen disruptions in power, thereby assuring the preservation and security of critical information and system stability.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for use in a host system to control a storage device, comprising:
    a power-loss detection module, configured to determine whether a power-loss event occurs according to a level of a supply voltage;
    a power-loss handling command buffer, configured to exclusively store one or more power-loss protection commands, wherein the power-loss handling command buffer is distinguished from one or more other command buffers designated for commands pertaining to regular operations in the apparatus; and
    a storage host controller, coupled to the power-loss detection module and the power-loss handling command buffer, configured to execute the one or more power-loss protection commands in the power-loss handling command buffer in response to the power-loss event, thereby to perform one or more specific operations on the storage device.

2. The apparatus of claim 1, wherein the storage device comprises a device controller and one or more storage units, and the storage host controller executes the one or more power-loss protection commands to send a power-off notification to the device controller of the storage device if it is determined that the power-loss event occurs.

3. The apparatus of claim 2, wherein the storage host controller executes the one or more power-loss protection commands to stop sending further access request to the storage device if it is determined that the power-loss event occurs.

4. The apparatus of claim 1, wherein the storage device comprises one or more storage units but no device controller, and the storage host controller executes the one or more power-loss protection commands to deactivate the one or more storage units by configuring a chip enable signal associated with the storage units to a disabling state if it is determined that the power-loss event occurs.

5. The apparatus of claim 4, wherein the storage host controller executes the one or more power-loss protection commands to stop sending erase and program commands to the storage device if it is determined that the power-loss event occurs.

6. The apparatus of claim 4, wherein the storage host controller executes the one or more power-loss protection commands to allow an ongoing operation of the one or more storage units to complete by maintaining a write protection signal associated with the one or more storage units at a writable state or erasable state if it is determined that the power-loss event occurs.

7. The apparatus of claim 1, wherein the power-loss detection module comprises:
    a comparator, configured to compare either the supply voltage or a regulated or converted voltage that is derived from the supply voltage with a predetermined threshold to determine whether the power-loss event occurs.

8. The apparatus of claim 1, wherein the power-loss detection module comprises:
    a voltage divider circuit, configured to divide either the supply voltage or a regulated or converted voltage that is derived from the supply voltage to generate a divided voltage; and
    a comparator, configured to compare the divided voltage with a predetermined threshold to determine whether the power-loss event occurs.

9. The apparatus of claim 1, wherein the storage device is a non-volatile memory.

10. A method for use in a host system to control a storage device, comprising:
    utilizing a power-loss handling command buffer to exclusively store one or more power-loss protection commands, wherein the power-loss handling command buffer is distinguished from one or more other command buffers designated for commands pertaining to regular operations;
    determining whether a power-loss event occurs according to a level of a supply voltage; and
    executing the one or more power-loss protection commands in response to the power-loss event, thereby to perform one or more specific operations on the storage device.

11. The method of claim 10, wherein the storage device comprises a device controller and one or more storage units, and the step of performing the one or more specific operations on the storage device comprises:
    sending a power-off notification to the device controller of the storage device if it is determined that the power-loss event occurs.

12. The method of claim 11, wherein the step of performing the one or more specific operations on the storage device comprises:
    stopping sending further access request to the storage device if it is determined that the power-loss event occurs.

13. The method of claim 10, wherein the storage device comprises one or more storage units but no device controller, and the step of performing the one or more specific operations on the storage device comprises:
    deactivating the one or more storage units by configuring a chip enable signal associated with the storage units to a disabling state if it is determined that the power-loss event occurs.

14. The method of claim 13, wherein the step of performing the one or more specific operations on the storage device comprises:
    stopping sending erase and program commands to the storage device if it is determined that the power-loss event occurs.

15. The method of claim 13, wherein the step of performing the one or more specific operations on the storage device comprises:

allowing an ongoing operation of the one or more storage units to complete by maintaining a write protection signal associated with the one or more storage units at a writable state or erasable state if it is determined that the power-loss event occurs.

16. The method of claim 10, wherein the step of determining whether the power-loss event occurs according to a level of a supply voltage comprises:

comparing either the supply voltage or a regulated or converted voltage that is derived from the supply voltage with a predetermined threshold to determine whether the power-loss event occurs.

17. The method of claim 10, wherein the step of determining whether the power-loss event occurs according to a level of a supply voltage comprises:

dividing either the supply voltage or a regulated or converted voltage that is derived from the supply voltage to generate a divided voltage; and comparing the divided voltage with a predetermined threshold to determine whether the power-loss event occurs.

18. The method of claim 10, wherein the storage device is a non-volatile memory.

\* \* \* \* \*